United States Patent [19]

Burroughs

[11] Patent Number: 4,779,251
[45] Date of Patent: Oct. 18, 1988

[54] OPTICAL DISK MEMORY SYSTEM WITH CLOSED LOOP MICRO-JUMP BETWEEN ADJACENT TRACKS

[75] Inventor: Alan C. Burroughs, San Jose, Calif.

[73] Assignee: Optimem, Mt. View, Calif.

[21] Appl. No.: 61,416

[22] Filed: Jun. 12, 1987

[51] Int. Cl.$^4$ ............................................. G11B 7/085
[52] U.S. Cl. ........................................ 369/32; 369/46
[58] Field of Search ............... 369/32, 44, 45, 46; 350/342; 250/201 DF

[56] References Cited

U.S. PATENT DOCUMENTS

| 4,057,832 | 11/1977 | Kappert | 369/44 |
| 4,234,837 | 11/1980 | Winslow | 369/44 |
| 4,674,081 | 6/1987 | Gerard et al. | 369/46 |
| 4,748,609 | 5/1988 | Yonezawa et al. | 369/46 |

Primary Examiner—Donald McElheny, Jr.
Attorney, Agent, or Firm—Baker, Maxham & Jester

[57] ABSTRACT

The servo positioning and tracking system of an optical disk drive utilizes the tracking error signal on a continuous, closed loop basis to move the optical beam from one track on the disk to an adjacent track. A circuit generates a ramp waveform that is used to introduce a controlled offset into the tracking servo. The servo error signal derived from pre-formatted fine tracking features on the disk is inverted in phase when the read beam is moving between the tracks. This allows the tracking servo loop to remain closed and stable at all times. The ramp waveform is generated based on tracking error information stored from the previous microjump, i.e., a single-track change in read beam position. The peak tracking error signal is stored by a peak sense and hold circuit, and used to adjust the amplitude of the ramp waveform. Peak tracking error information allows the precise motion of the read spot and provides the proper timing to switch polarity of the tracking error signal read from the disk.

10 Claims, 3 Drawing Sheets

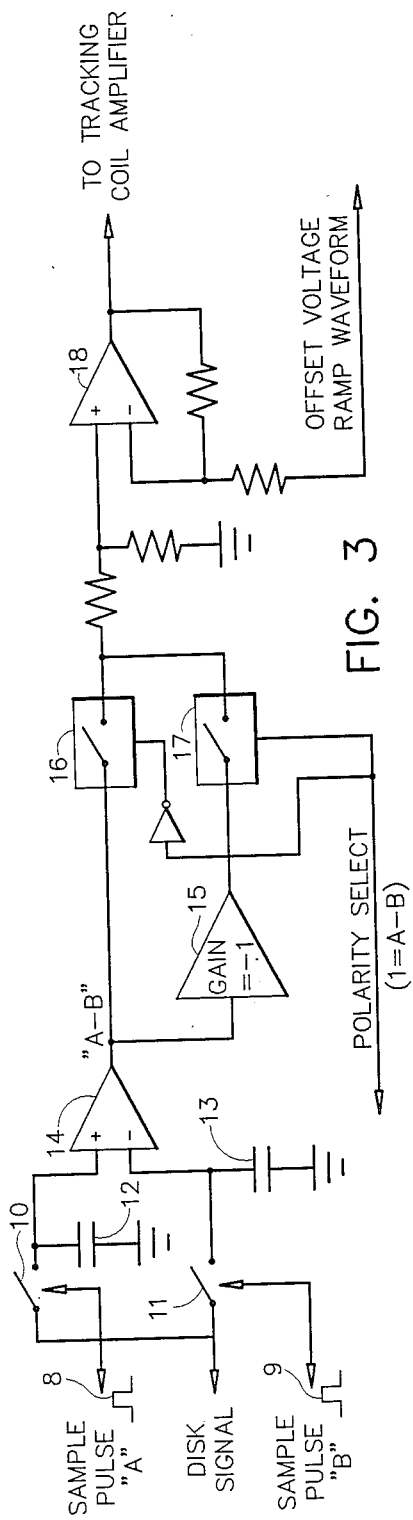
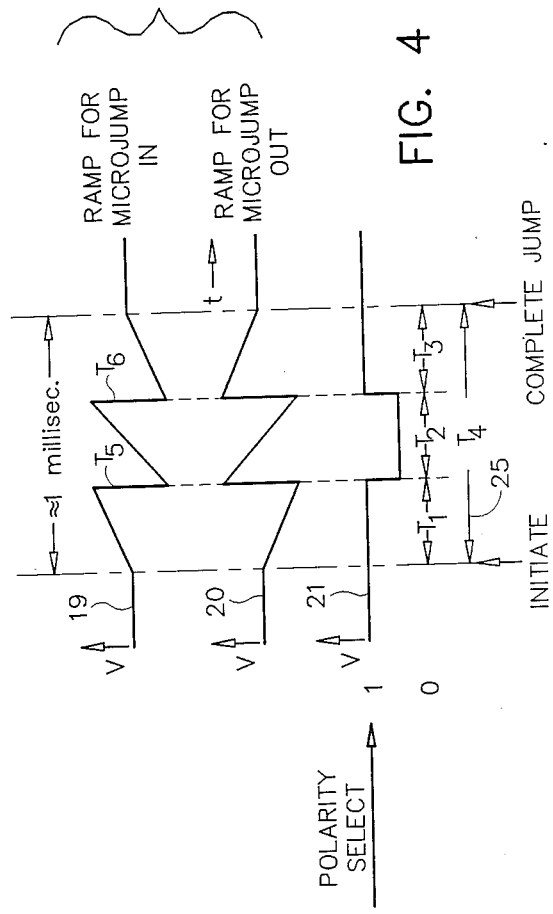

OPTICAL DISK MEMORY SYSTEM WITH CLOSED LOOP MICRO-JUMP BETWEEN ADJACENT TRACKS

CROSS-REFERENCE TO RELATED DISCLOSURE DOCUMENT

Reference is made to applicant's Disclosure Document No. 159040 filed in the U.S. Patent & Trademark Office on Nov. 13, 1986 and entitled "Closed Loop Micro-jump."

BACKGROUND OF THE INVENTION

The present invention relates to optical memory systems, and more particularly, to an improved servo positioning and tracking system for accurately moving the beam of an optical disk storage device in a closed loop manner from one track to an adjacent track on the disk.

In a typical "write once read mostly" (WORM) optical memory system a laser beam is modulated by a pulse signal from an external information source and is recorded in binary form on the surface of a disk made of a special media. This is accomplished by physically altering small regions of the media arranged in concentric or spiral tracks. Such physical alteration may be in the form of heating to cause the formation of minute bubbles. The information recorded can be read by reflecting a laser beam off the surface of the disk at a lower power so as not to physically alter the small regions. See for example U.S. Pat. No. 4,466,087 of Cheng assigned to Xerox Corporation and entitled "Optical Memory System for a Reading/Writing, Verifying and Tracking Module."

By way of example, in one commercially available optical disk drive utilized as a peripheral storage device for a computer system, a twelve-inch disk has approximately 40,000 tracks resulting in a track density of 14,500 tracks per inch (tpi), a track pitch (distance between track center lines) of seventy micro-inches and a track width of twenty-four micro-inches.

In a typical optical disk drive utilized for data storage, the disk is grooved similar to laser video disks. The disk is impressed with radial servo-tracking information, data-synchronization signals and pre-formatting to provide radial head positioning feedback. The head positioning servo must be capable of accurately following the tracks and accommodating groove non-concentricity due to spindle run out, media wear and media errors.

When the typical optical disk drive performs a seek, a coarse actuator and a fine positioner actuator direct the read/write head. The coarse actuator is similar to the rotary voice-coil positioners used in some magnetic disk drives. The fine positioner, a small voice-coil actuator, is mounted on the coarse actuator. It moves the final focus lens radially across the tracks as well as up and down for focus control. When a long seek is initiated, an optical scale on the coarse positioner provides positioning feedback to the coarse positioner to bring the read/write head within the access range of the fine positioner. The fine positioner servo loop is then closed to acquire a track, read an address from the disk, determine the exact track position and compute a correction factor (the difference between the located address and the desired address). The fine positioner then locates the proper track. See for example U.S. Pat. No. 4,627,039 of Meyer assigned to Magnetic Peripherals, Inc. and entitled "Head Positioning Servo System for Optical Recording with Coarse and Fine Control." See also U.S. Pat. No. 4,627,038 of Abed et al. assigned to Storage Technology Partners II, and entitled "Optical Disk Storage Unit Having a Servo System with Different Velocity Inputs."

It is also possible to construct an optical disk drive without a coarse actuator. In such a drive all of the radial positioning of the read spot is accomplished by energizing a coil in the objective lens assembly.

Tracking information for optical disks can be derived from flags that are offset from true track center and are sampled as the disk rotates. A tracking error signal can be generated by taking the difference of the readback amplitude of these flags and applying that signal to the fine lens positioner to keep the read beam on track center. However, the difficulty arises when attempting to "micro-jump" to an adjacent track because the phase of the error signal is reversed when between track centers. In other optical disk drives that use the so-called "continuous far-field tracking technique" an error signal is continuously generated by monitoring fine tracking features on opposite sides of the data track groove. A tracking error signal is also generated which is applied to the fine positioner. Prior optical disk tracking techniques have opened the fine tracking loop and injected a fixed-length pulse. However, small variations in track pitch cause unreliable micro-jumps, resulting in poor system performance. Prior fine positioner systems have not accommodated small variations in track pitch, tracking gain, disk reflectivity or disk defects.

SUMMARY OF THE INVENTION

It is the primary object of the present invention to provide an improved servo positioning and tracking system for accurately moving the beam of an optical disk storage device in a closed loop manner from one track to an adjacent track on the disk.

According to the present invention, the servo positioning and tracking system of an optical disk drive utilizes the tracking error signal on a continuous, closed loop basis to move the optical beam from one track on the disk to an adjacent track. A circuit generates a ramp waveform that is used to introduce a controlled offset into the tracking servo. The servo error signal derived from preformatted fine tracking features on the disk is inverted in phase when the read beam is moving between the tracks. This allows the tracking servo loop to remain closed and stable at all times. The ramp waveform is generated based on tracking error information stored from the previous micro-jump, i.e., a single-track change in read beam position. The peak tracking error signal is stored by a peak sense and hold circuit, and used to adjust the amplitude of the ramp waveform. Peak tracking error information allows the precise motion of the read spot and provides the proper timing to switch polarity of the tracking error signal read from the disk.

BRIEF DESCRIPTION OF THE DRAWINGS

FIG. 3 is a schematic diagram of a preferred embodiment of the micro-jump circuitry which may be incorporated into conventional fine tracking circuitry.

FIG. 4 illustrates the waveforms for the two signals generated by the micro-jump circuitry of FIG. 3.

DESCRIPTION OF THE PREFERRED EMBODIMENT

My invention can be used to make reliable one-track jumps when operating on high track density disks with either sampled tracking flags or continuous far-field tracking. For example, one type of optical drive relies on offset tracking flags to generate a tracking error signal. This is referred to as "A-B" or flag difference signal, and is derived by sampling two flags or features that are physically located on either side of the written data track. To initiate a single-track jump in accordance with my invention, a ramp is introduced into the tracking loop in order to push the focused spot toward the adjacent track. This is done until the spot is over, or centered, on the tracking flag. Then both the ramp and tracking error signal are inverted in polarity, which causes the beam to move over to the flag of the adjacent track. The ramp and error signal are inverted once again to allow the spot to go to the center of the desired track. At no time is the loop feedback opened. Thus, the beam arrives at the desired track regardless of changes in the disk from one track to the next. This is a common problem associated with optical disks, but a problem not found in magnetic disks because the servo tracks are formatted by the drive itself, not stamped into the disks when they are manufactured.

Several unique techniques apply to the circuit used in my invention to accomplish closed-loop micro-jump. A peak detector is used to hold the peak value of the previous micro-jump tracking error signal. This peak detector must sample on the peak of the first flag crossing to generate the proper ramp offset amplitude for the second flag crossing. The offset ramp time is held constant, regardless of gain, by varying the current into a capacitor in proportion to the voltage stored on the tracking signal peak detector. This forces the micro-jump period to be constant regardless of disk or system variations. The number of track crossings are counted during the micro-jump period. If it exceeds one, the tracking loop reverts to a lock-up position loop and does not allow the actuator to move more than a predetermined number of tracks, e.g., seventy. Thus according to my invention a nonlinear position error signal derived from the disk is used to control a position servo in a linear fashion by introducing a noncontinuous DC offset to the positioner loop. This technique keeps the position loop closed and provides a smooth transition from track to track in an optical disk system.

As used hereafter, the term "pre-formatted fine tracking features" refers to both offset flags and continuous features in the grooves. Optical disk drive systems employing either sampled offset tracking flags or continuous far-field tracking both generate a tracking error signal. These two systems, while optically different, each have similar tracking servo loops.

Figure 2:
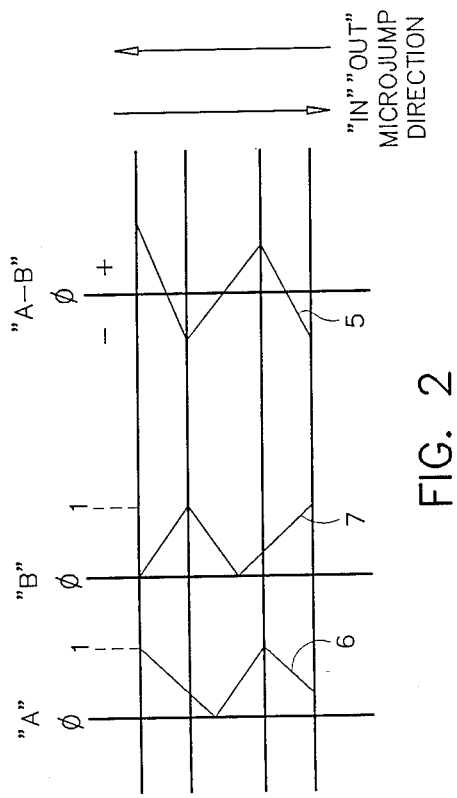
FIG. 2 illustrates the waveforms of the amplitudes of the tracking flags as the read beam moves between the adjacent tracks.
Figure 1:
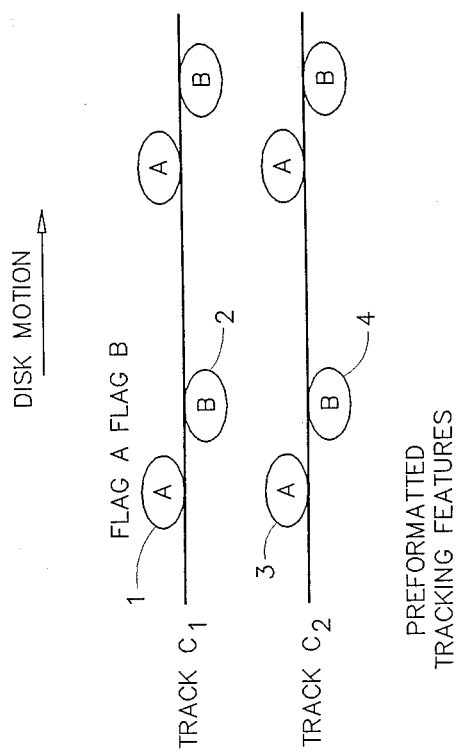
FIG. 1 is a diagrammatic illustration of preformatted offset tracking flags on two adjacent tracks (CL1 and CL2) of an optical disk.

The preferred embodiment described hereafter is described in conjunction with an optical disk drive system having sampled offset tracking flags. However, it will be understood that my invention is equally applicable to disk drive systems employing the continuous far-field tracking technique. Referring to FIG. 1, a read spot moves along the centerline of track CL1 bordered on opposite sides by corresponding pairs of pre-formatted offset features in the form of flag A and flag B. The amplitude of these flags is sampled independently and the difference signal is measured. Waveform 5 (FIG. 2) shows how the A-B amplitude varies as the read beam is moved from track CL1 to an immediately adjacent track CL2. As the read beam passes between B flag 2 and A flag 3, the polarity of the A-B waveforms is negative. Waveforms 6 and 7 illustrate how the waveforms of the individual sampled flags vary as the read beam moves between the adjacent tracks.

Referring to FIG. 3, sample pulses 8 and 9 operate analog switches 10 and 11 to store the peak value of A flag 1 and B flag 2, respectively, on capacitors 12 and 13. The difference is measured by amplifier 14 and the inverted signal is formed by inverting amplifier 15. The output of either non-inverting amplifier 14 or inverting amplifier 15 is selected by polarity select waveform 21 (FIG. 4) by analog switches 16 and 17. The output of switches 16 and 17 is sent to amplifier 18 where it summed with ramp waveform 19 or waveform 20 (FIG. 4), depending on whether the read spot is moved radially in or out on the disk. Waveforms 19 and 20 illustrate the unique ramp used to move the read spot to an adjacent track. Time intervals T1, T2, T3 and T4 are shown as typical values and would vary according to the application. At times T5 and T6, the ramp waveform is switched in polarity and the alternate signal A-B or B-A is selected by switch 16 or switch 17. The ramp waveforms 19 and 20 are continuous and monotonic during time interval T4 except when the error signal of opposite polarity A-B of B-A is selected by switch waveform 21.

Figure 5:
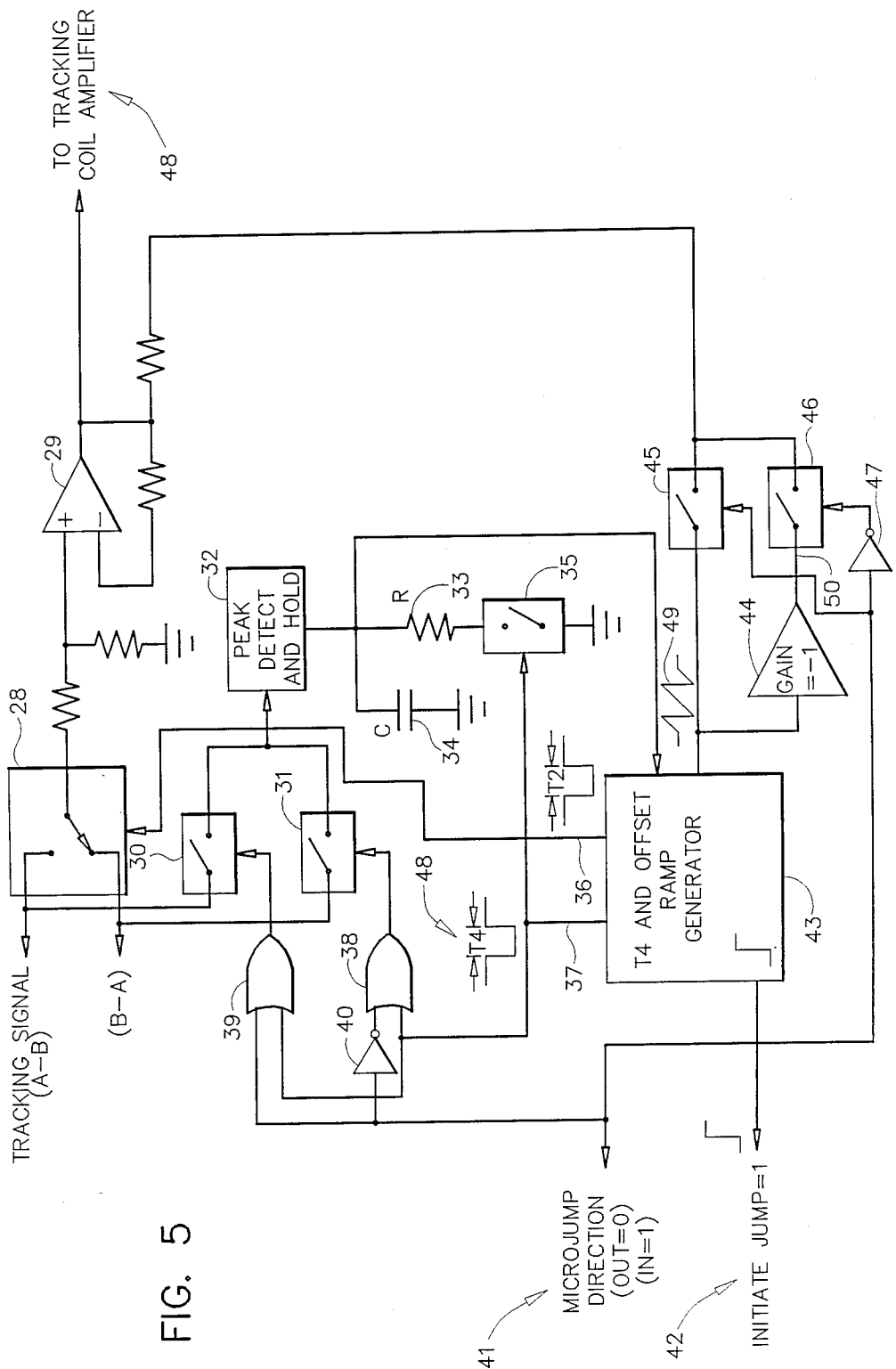
FIG. 5 is a block diagram illustrating how the offset ramp is injected into the fine positioning loop.

Referring to FIG. 5, the peak amplitude of tracking signal A-B is used to generate the proper amplitude of offset ramp 49. The proper polarity of offset ramp 49 is selected and sent to summing amplifier 29. When not in micro-jump mode, signal A-B is selected by analog switch 28 and sent to the input of summing amplifier 29. Error signal B-A is selected by analog switch 28 during interval T2. During interval T4, analog switches 30 and 31 select either A-B or B-A to the input of peak detector 32, depending upon whether the adjacent track (to be moved to) is radially in or out on the disk. If moving radially out, micro-jump direction line 41 is logical low to OR gate 39 and inverter 40. During interval T4, the output of OR gate 39 is low and analog switch 30 is on. This provides signal A-B to the input of peak detector 32 and the peak value of A-B is held at capacitor 34. A path for the discharge current is provided by resistor 33 when analog switch 35 is on during time interval T4. The voltage level stored at capacitor 34 is sent to offset ramp generator 43 and ramp 49 of equal amplitude to this voltage is generated. This ramp is sent to analog switch 45 or to inverting amplifier 44. The output of inverting amplifier 50 is fed to analog switch 46. One of the two switches is selected by micro-jump direction line 41. The non-inverted ramp 49 is selected if micro-jump direction line 41 is logical low. The appropriate ramp, 49 or 50, is sent to the summing amplifier 29. The output of summing amplifier 29 is sent to a tracking coil amplifier 48 where it can be used to control the position of the read beam spot.

The block diagram of FIG. 5 can be implemented with any one of a number of commercially available parts. However, the following parts are exemplary:

TABLE I

| Element | Part No. |
| --- | --- |
| Analog switches 28, 30, 31, 45 and 46 | HC4016 |
| OR gates 38 and 39 | 7432 |
| Amplifiers 26 and 44 | LF353 |
| Inverter gates 40 and 47 | 7406 |

Having described a preferred embodiment of my optical memory system with closed loop micro-jump between adjacent tracks, it should be apparent to those skilled in the art that my invention may be modified in both arrangement and detail. For example, the illustrated embodiment will perform acceptably with a track pitch of between one and five micro-meters, but my invention could be implemented to operate with smaller track pitches. Also, as already indicated, the circuitry of FIG. 5 may also be utilized with the tracking loop servo of an optical disk drive that employs the continuous far-field tracking technique. Therefore, the protection afforded my invention should only be limited in accordance with the scope of the following claims.

I claim:

1. In an optical disk memory system having a positioner for moving a read spot of a laser beam radially between first and second immediately adjacent tracks on an optical disk having pre-formatted fine tracking features, circuitry for generating a tracking error signal based upon the location of the read spot relative to the pre-formatted fine tracking features, and a servo loop including a tracking coil amplifier, the improvement comprising:

means for generating a ramp signal;
summing means for receiving first and second inputs and generating an output representative of the sum of the first and second inputs;
means for applying the output of the summing means to the tracking coil amplifier of the servo loop;
means for inputting as the first and second inputs to the summing means the tracking error signal and the ramp signal to cause the read spot to move away from the first track toward the second track to a first intermediate position therebetween;
means for thereafter inputting as the first and second inputs to the summing means an inverted form of the tracking error signal and an inverted form of the ramp signal to cause the read spot to move further toward the second track to a second intermediate position therebetween; and
means for thereafter inputting as the first and second inputs to the summing means the tracking error signal and the ramp signal to cause the read spot to move substantially over the second track.

2. An optical disk memory system according to claim 1 and further comprising:

means for detecting a peak value of the tracking error signal from a prior movement of the read spot between a pair of adjacent tracks on the disk; and
means for adjusting the amplitude of the inverted tracking error signal based on the peak value.

3. An optical disk memory system according to claim 1 wherein the pre-formatted fine tracking features are offset flags.

4. An optical disk memory system according to claim 1 wherein the pre-formatted fine tracking features are continuous and are on opposite sides of each track.

5. An optical disk memory system according to claim 3 wherein the tracking error signal and the ramp signal are inputted to the summing means to cause the read spot to move from the first track until it is substantially over a first offset flag between the first and second tracks.

6. An optical disk memory system according to claim 5 wherein the inverted form of the signal and the inverted form of the ramp signal are inputted to the summing means to cause the read spot to move toward the second track from the first offset flag until it is substantially over a second offset flag between the first and second tracks.

7. An optical disk memory system according to claim 6 wherein the tracking error signal and the ramp signal are inputted to the summing means to cause the read spot to move toward the second track from the second offset flag until it is substantially over the second track.

8. An optical disk memory system according to claim 1 wherein the summing means includes an amplifier.

9. An optical disk memory system according to claim 1 wherein the means for inputting the inverted form of the tracking error signal and the inverted form of the ramp signal includes an inverting gain amplifier.

10. An optical disk memory system according to claim 2 wherein a duration of the ramp signal is held substantially constant.

* * * * *